(12) United States Patent
Emma et al.

(10) Patent No.: US 6,389,505 B1
(45) Date of Patent: May 14, 2002

(54) RESTORE TRACKING SYSTEM FOR DRAM

(75) Inventors: Philip George Emma, Danbury, CT (US); William Robert Reohr, Bronx, NY (US); Li-Kong Wang, Montvale, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/196,086

(22) Filed: Nov. 19, 1998

(51) Int. Cl.[7] .............................................. G06F 12/00
(52) U.S. Cl. ...................... 711/106; 365/222
(58) Field of Search ................................ 711/105, 106, 711/154; 365/185.25, 222

(56) References Cited

U.S. PATENT DOCUMENTS

| | | | | | |
|---|---|---|---|---|---|
| 5,446,696 | A | * | 8/1995 | Ware et al. | 365/222 |
| 5,684,751 | A | * | 11/1997 | Manning | 365/222 |
| 6,104,658 | A | * | 8/2000 | Lu | 365/222 |
| 6,134,167 | A | * | 10/2000 | Atkinson | 365/222 |
| 6,222,785 | B1 | * | 4/2001 | Leung | 365/222 |
| 6,230,235 | B1 | * | 5/2001 | Lu et al. | 711/106 |
| 6,230,274 | B1 | * | 5/2001 | Stevens et al. | 713/320 |
| 6,269,039 | B1 | * | 7/2001 | Glossner, III et al. | 365/210 |

* cited by examiner

*Primary Examiner*—Kevin L. Ellis
*Assistant Examiner*—Christian P. Chace
(74) *Attorney, Agent, or Firm*—Robert P. Tassinari, Jr.

(57) ABSTRACT

A system and method for reducing the number of refresh actions needed to maintain data in a DRAM, by restoring only those cells which haven't been read from or written to within an allotted data retention time. One embodiment describes a restore tracking system as applied to a DRAM cache. The restore tracking system can alternatively be applied to any memory architecture having duplication of information. For example, the number of refresh actions needed to maintain data entries in a DRAM can be reduced by recording and updating a refresh status of one or more of the data entries in the DRAM; and invalidating those data entries having an expired status. Thus, more memory bandwidth can be made available to a computer system.

80 Claims, 12 Drawing Sheets

DRAM Used as a Cache Memory

RESTORE TRACKING SYSTEM FOR DRAM

FIELD OF INVENTION

This invention generally relates to DRAM. In particular it relates to a reduction in the number of refresh actions needed to maintain data in the DRAM.

BACKGROUND

DRAM (Dynamic Random Access Memory) is the lowest cost semiconductor memory available today because it has the smallest viable memory cell. An example of a conventional memory cell comprises a capacitor and a transistor. The capacitor stores electric charge. The quantity of charged stored on the capacitor represents the state of the memory cell, either a zero or a one. Access to the capacitor is governed by a transistor. Through the access transistor, address logic can single-out a memory cell, for a read or write operation, from among an array of cells connected by a common wire called a bitline.

As is well known, even when the access transistor is turned off, a small leakage current trickles through its (drain and source) terminals. Over time, the finite leakage adds or removes enough charge so that it can disturb the state of the memory cell. To prevent that from occurring, the charge stored on the capacitor must constantly be restored, to its nominal value, through a hardware mechanism. A write action is the means by which a fresh state is stored in a DRAM cell. Regardless of whether the write had been issued to refresh the state of the cell or to store a new state in the cell, the net result is the same. The cell state is set to its nominal value, either a "1" or "0", by a write. After a read, the contents of a DRAM cell must always be restored because the sensing required to detect the cell state also destroys its contents. A destructive read is always followed by a restoring write. The "write-back" stores the data back into the cell that was just read. Every DRAM also has a restore subsystem which periodically sweeps through its entire address space to refresh all its memory cells. Cell banks are inaccessible for a read or write operation during the restoration process. A periodic restore is necessary because some memory cells would not otherwise be restored before they had exceeded the data retention time.

Unfortunately, refresh actions stall other pending requests. It is therefore desirable to minimize the total number of refresh actions so as to maximize the memory bandwidth. Existing DRAM memory cells are typically refreshed after a fixed number of clock cycles regardless of whether those same cells have been restored by means of a read or write action. Thus, the need exists for an improved restore tracking system for DRAM. The present invention addresses such a need.

SUMMARY

In accordance with the aforementioned needs, the present invention includes features for restricting the frequency of refresh operations on a DRAM, by providing a restore tracking system which eliminates the periodic refresh of DRAM entries.

An example of a restore tracking system for reducing a number of refresh actions needed to maintain data entries in a DRAM, in accordance with the present invention comprises: restore tracking means for recording and updating a refresh status of one or more of the data entries in said DRAM; and control logic means, coupled to the restore tracking means, for refreshing one or more of the data entries having an expired status.

In a preferred embodiment of the present invention, the DRAM is used as cache. An example of a restore tracking system for reducing a number of refresh actions needed to maintain data entries in a DRAM integrated within a cache memory including blocks of memory cells which can be refreshed by an external mechanism, comprises: a restore tracking circuit devoted to each block of memory cells for the purpose of tracking a total time elapsed since the block was last restored; wherein the external mechanism includes an external means for triggering a refresh of the block if said restore tracking circuit of the said block reaches a maximum specified data retention time of the DRAM.

The present invention has other features which provide a mechanism for tracking when a memory location was last restored.

The present invention has still other features which provide a timing component, having both discrete and analog embodiments, that can be used in the aforementioned restore tracking mechanism.

The present invention has yet other features for refreshing in a discriminating manner, only those cache entries that have been modified.

The present invention has other features for invalidating in the directory, those data packets whose data will expire, but which exist in duplicate within the memory hierarchy.

BRIEF DESCRIPTION OF THE DRAWINGS

The foregoing and other objects, aspects, and advantages will be better understood from the following detailed description with reference to the drawings, wherein:

FIG. 6b depicts an example of the internal node voltage of the analog clock of FIG. 6a;

DETAILED DESCRIPTION

Figure 1:
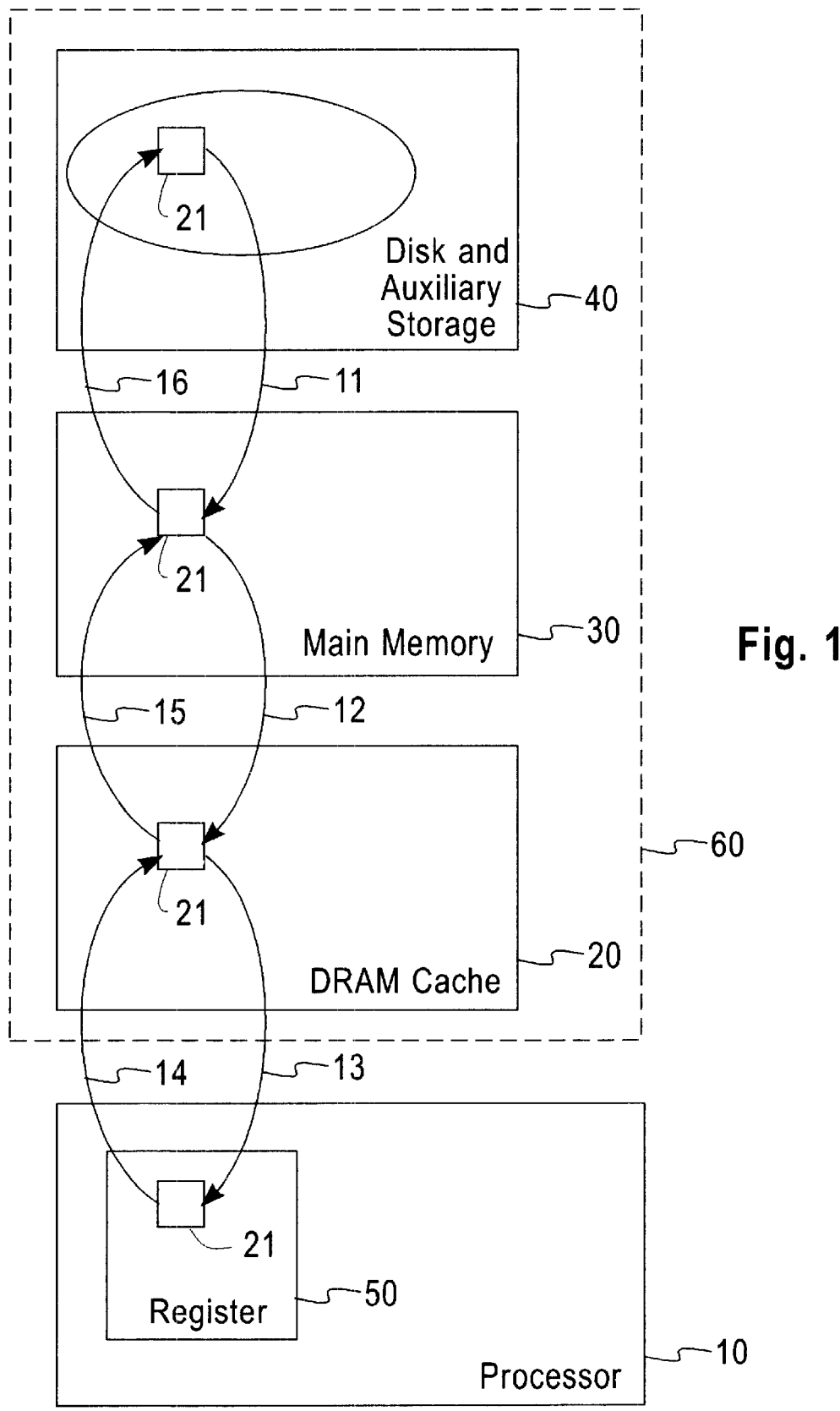
FIG. 1 depicts an example of a processor coupled to a memory hierarchy, illustrating how data packets can be moved and duplicated within various levels of the memory hierarchy in accordance with the present invention.

FIG. 1 depicts an example of a computing system having features of the present invention. As depicted, the system includes a processor 10, coupled to a memory hierarchy 60 which stores program instructions and/or program data. The memory hierarchy 60 includes a cache 20, main memory 30, and auxiliary memory 40. In a preferred embodiment of the present invention, the cache 20 is populated with DRAM arrays. The DRAM cache 20 holds a subset of the data for easy access by the processor 10. The processor 10 retrieves program instructions and program data from the memory hierarchy 60. Arrows (11 through 13) show the path data traverses as it is retrieved from auxiliary memory 40 and brought into the register 50 of processor 10. Likewise, the processor 10 stores program data, and in rare cases program instructions, to the memory hierarchy 60. Arrows (14 through 16) show a path by which the contents of register 50 may be moved out to the auxiliary memory 40. The memory hierarchy 60 is configured to provide the processor 10 with low latency and high bandwidth access to data. A hardware mechanism, for example a Least Recently Used (LRU) algorithm, coordinates the orderly transfer of a data packet 21 between different levels of memory hierarchy. A data packet required by the processor 10 is funneled from large and slow auxiliary memory 40 to small and fast DRAM cache memory 20 which lies in close physical proximity to the processor 10. Due to a fortuitous combination of temporal and spatial characteristics of data requests, the movement of a data packet into the DRAM cache usually pre-empts the request of that same data by the processor. The data packet can be quickly retrieved from the fast DRAM cache 20, altogether circumventing the long delay to access the slow auxiliary memory 40. The DRAM cache 20 handles a large volume of traffic. Because the DRAM cache 20 is limited in size and yet sustains such a high throughput, its memory locations are in constant use. They are thus naturally refreshed by a write or write-back. Recall a write-back must always follow a destructive read according to DRAM protocol. Consequently most memory cells are restored in the DRAM cache 20 without ever relying on an externally initiated refresh operation.

By way of overview, the present invention, takes advantage of this natural refresh operation occurring in the DRAM cache 20, by tracking the status of each data packet (Congruence class) with a dedicated timer. When the timer expires, the packet of data should be invalidated because it could be corrupt; the next time the data packet is required by the processor, a miss will occur in the DRAM cache 20. The data packet must then be fetched from main memory. This procedure handles all data packets except those which have been modified. If a modified data packet, stored in the DRAM cache 20, happens to be the only updated copy existing in the entire memory hierarchy 60, then the data packet must be refreshed by a dedicated restore operation. This situation arises in Store-In Caches (described in more detail with reference to FIGS. 8 and 9). Here, no other copy of the modified data packet (cache entry) exists in the entire memory hierarchy 60, and thus once the data retention time has elapsed, the modified data packet must be restored.

Figure 2A:
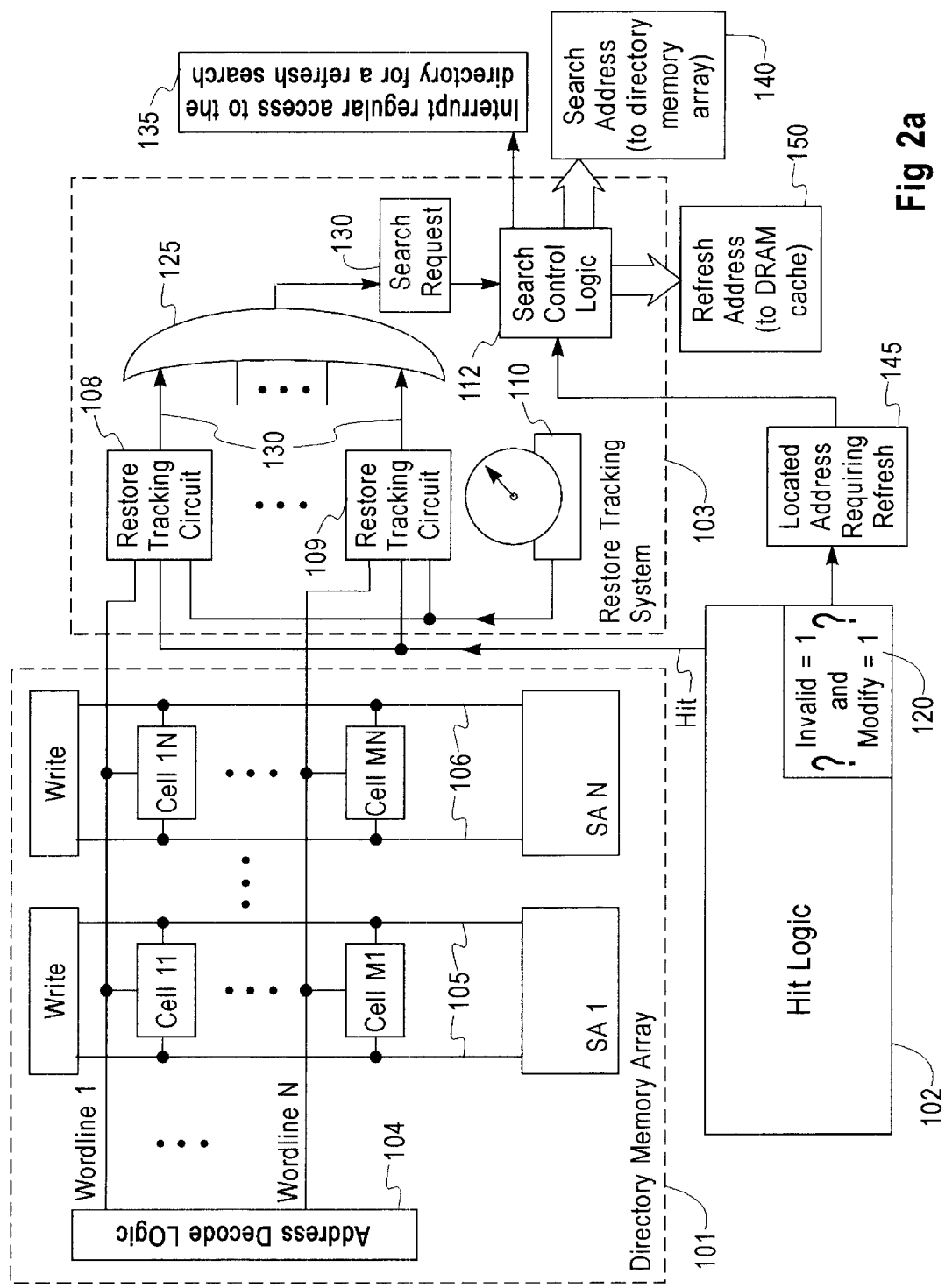
FIG. 2a depicts an example of a restore tracking system in accordance with the present invention, coupled to a Directory memory array and hit logic.
Figure 2B:
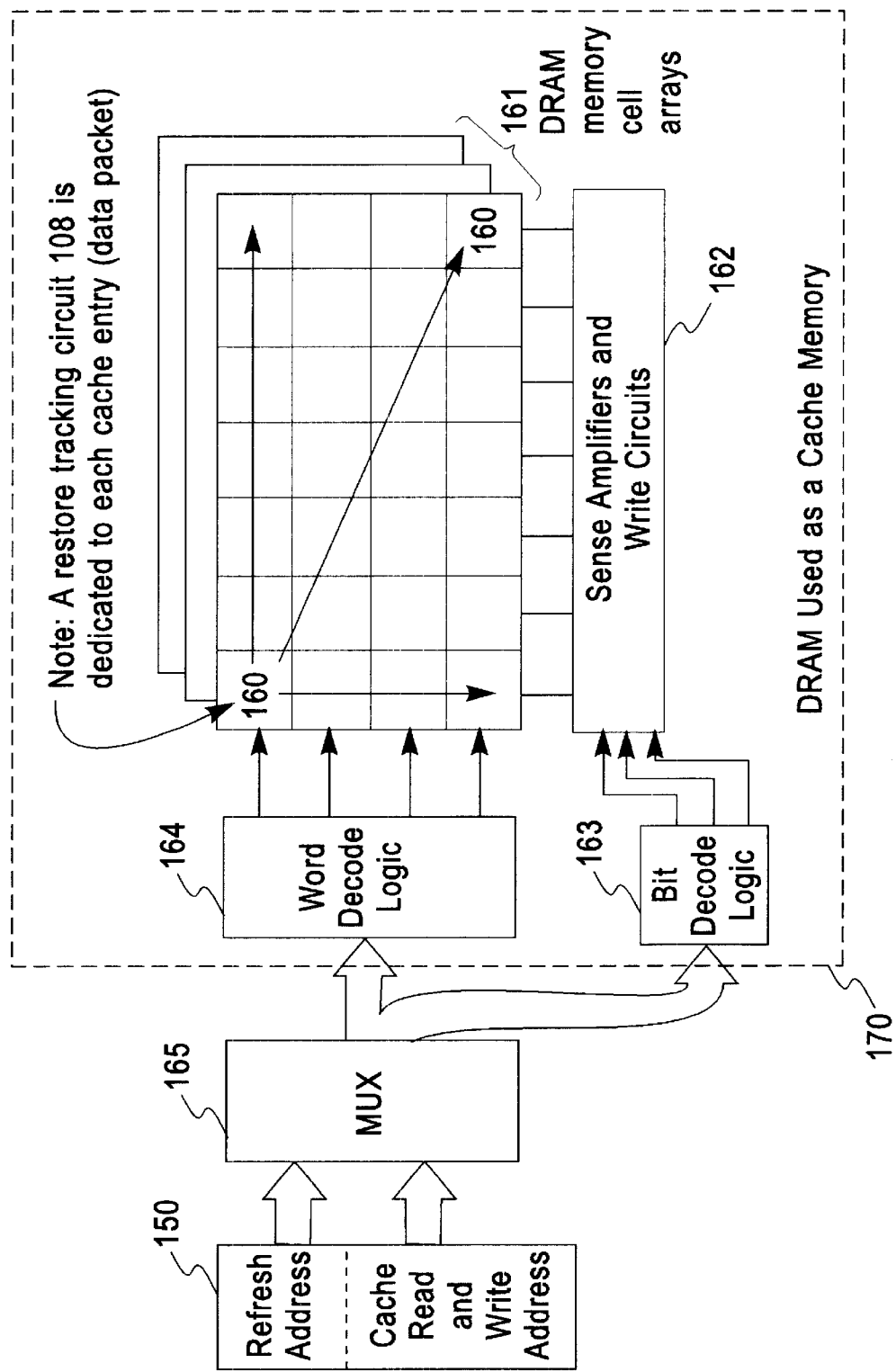
FIG. 2b depicts a DRAM used as a cache memory in accordance with the present invention.

By way of further introduction, the functional components of a cache will now be discussed. The combination of FIGS. 2a and 2b depict an example of a cache having features of the present invention. FIG. 2a depicts an example of a restore tracking system in accordance with the present invention, coupled to a Directory memory array and hit logic. FIG. 2b depicts an example of a DRAM used as a cache memory in accordance with the present invention. Referring now to FIGS. 2a and 2b, the system includes: a cache memory 170; a directory array 101; hit logic 102; and a restore tracking system 103. The directory memory array 101 holds tag address bits and directory status bits. Status bits define whether a cache entry 160 is valid and whether it can be read or written; a detailed discussion of status bits will be deferred to a more appropriate context. Within the cache memory 170, a unique address for data is split into a tag address and a base address. The tag address is stored in the directory. The base address is used to address both the directory memory array 101 and cache memory 170. Over time, a single cache entry will store data packets having the same base address but different tag addresses. When a request for a particular address is directed to the cache, the tag address is read out of the directory, and driven into the hit logic 102 where its is compared with the tag portion of the requested address. If the two tags match, the cache memory 170 holds the requested address, amd a "hit" is said to have occurred in the cache. If the two tags don't match, the cache memory 170 does not contain the requested address, and a "miss" is said to have occurred in the cache. A request for the missed address must be presented to main memory 30.

It should be noted that in the context of the present invention, the "hit logic signal" or "hit" depends on a number of cache control signals within the hit logic 102, and while it generally relates to the aforementioned address comparison, it should not be interpreted as an exclusive relationship. For example, the hit logic signal will need to be forced to specific states when data retention clocks within the restore tracking system are initialized. Therefore, the usual meaning of a hit logic signal will be further adapted to accommodate the nuances of the present invention.

The restore tracking system 103 is coupled to the directory of the DRAM cache (FIG. 1, 20) to minimize circuit overhead. Specifically, FIG. 2a depicts one way to interconnect the directory memory array 101, the hit logic circuits 102, and the restore tracking system 103.

The Directory array circuits 101 are unaffected by integration. Address decode logic 104 is still required to select an active Wordline 1 . . . Wordline N. A high Wordline N activates memory cells M1 through MN, which typically are six transistor SRAM cells, for either a read or write operation. In the case of a read, sense amplifiers (SA) 1 through (SA) N amplify the small signals, produced by the active cells attached to bitline pairs 105 through 106, driving these larger swing signals to the hit logic 102.

The restore tracking circuits (108 through 109)—examples of which will be described in more detail below and in particular with reference to FIGS. 3a–b and 7—monitor the time elapsed since a cache entry (data packet) was last refreshed. An external clock 110 synchronizes the internal clocks of each restore tracking circuit. One restore tracking circuit 108 is devoted to each cache entry (data packet) 160. As a means of sharing decoding circuitry between the directory memory array 101 and the restore tracking logic 103, wordlines 1 through N connect to the restore tracking circuits 108 through 109. A one to one correspondence between the directory wordline and a DRAM cache entry (data packet) is assumed for simplicity sake until otherwise noted.

In the event that the data retention time tracked by the clock within the restore tracking circuit (discussed in more detail below) elapses (also called expires or expired), a status bit is set (e.g., Invalid=1) to designate that the data as invalid. In the usual case, the next time a request to that cache location is made, a miss will occur. That miss will cause the cache entry (data packet) to be fetched from the main memory 30. However, if the data has also been modified, indicating the cache entry (data packet) has been written, a refresh search request 130 is coupled to the search control logic 112. Here, all the refresh search requests are OR'ed 125 together to provide a signal to the search control logic 112 to start processing a refresh interrupt 135. During the interrupt, regular access to the Directory 101 is interrupted for the refresh search and the address space of the directory is searched (cycled) 140 until the line requiring refresh is located. The search stops when the directory address that initiated the refresh search is located. The directory entry will have a high modified bit and a high invalid bit (Invalid=1 and Modify=1) 120. The data packet of the DRAM cache 20, corresponding to the located directory entry 145, is then refreshed 150, and the invalid status bit is set to zero. These actions advantageously prevent a data packet within the memory hierarchy from ever becoming corrupt.

Figure 3A:
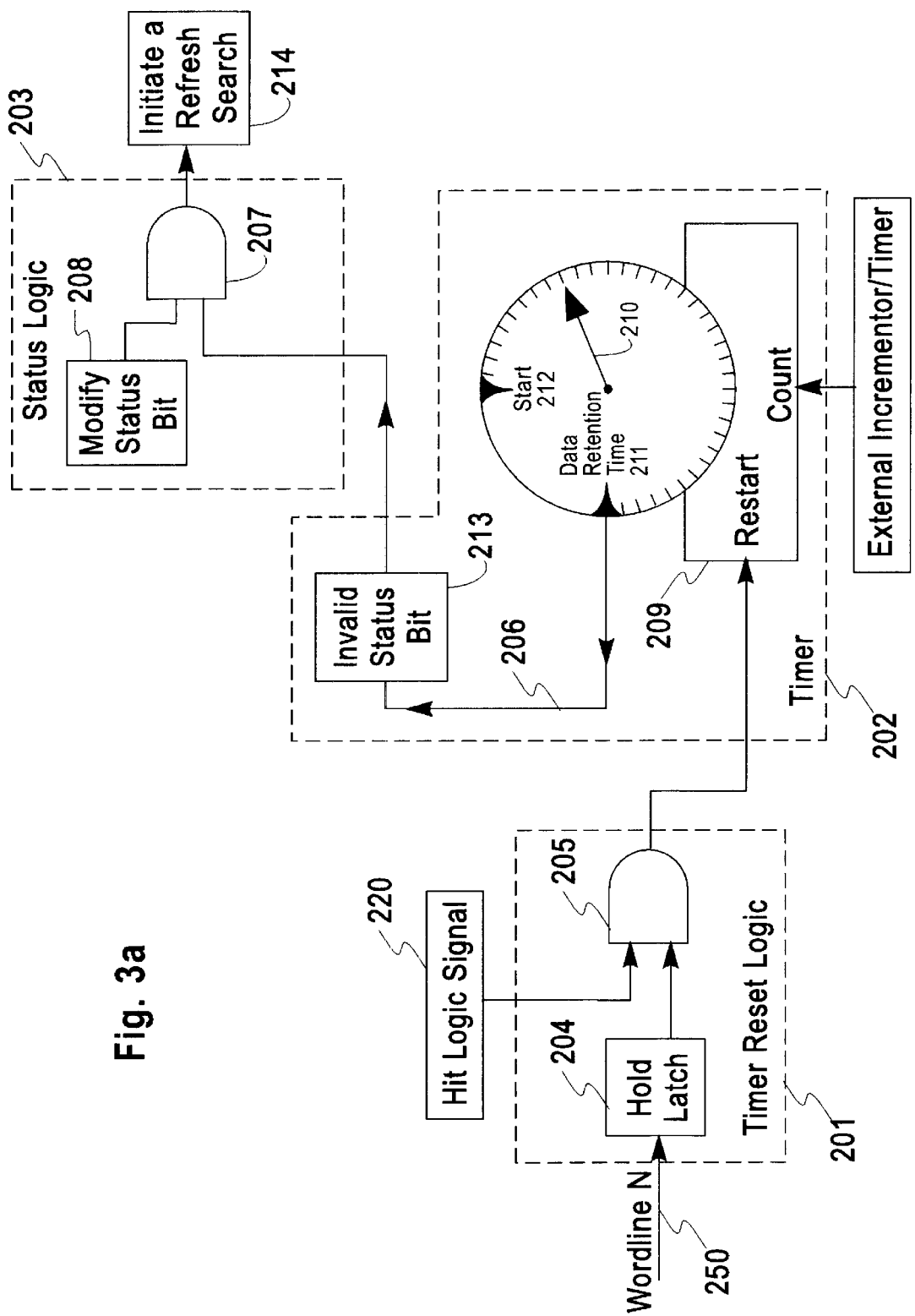
FIG. 3a depicts an example of the restore tracking circuit.

FIG. 3a depicts a more detailed example of the restore tracking circuit 130. As depicted, the restore tracking circuit includes a timer reset logic 201, a timer 202, and a status logic 203. The timer 202, examples of which include but are not limited to a counter or analog device, saturates once the time exceeds a threshold corresponding to the data retention time of a DRAM cache 20 line. Under these circumstances, data held in the DRAM cache line is either considered invalid or in need of refresh. Because data retention times are typically on the order of milliseconds while cycle times are on the order of nanoseconds, a cache entry (data packet) has to be refreshed only after a million cycles or so. Considering a cache entry (data packet) can last a million cycles, the plethora of reads and writes to different cache addresses tends to restore most cache entries obviating the need for an independent restoration for all but a few cache entries. This observation provides the impetus for the present invention. Furthermore, in an actual system, many thousand machine cycles can pass without loss of data because the data retention time is specified conservatively. Thus, many cycles are available to report on and act upon a timer 202 which has exceeded its limit.

Each cycle, an active wordline (depicted in FIG. 2a, Wordline 1 . . . Wordline N) selects a single restore tracking circuit from the group of circuits (108 through 109). Since the wordline is typically pulsed high for only a fraction of the cycle, the wordline state typically needs to be captured by means of a hold latch (FIG. 3a, 204) for further processing by the timer reset logic 201. The active wordline N of the directory (FIG. 3a, 250) singles out the cache entry (data packet) which has the potential to be restored by a read or write action. A final determination of whether the cache entry will be restored is made by the hit logic 102. The hit logic compares a tag address sub portion of the address field, read out of the directory 101 to the tag address requested by the processor 10. If the two addresses match, a hit occurs, assuring the DRAM cache entry will be used, and thus restored within a few cycles. FIG. 3a shows the hit logic signal 220 being used to gate the decision to restart the clock 209 via an AND gate 205. When the timer reset logic 201 determines the DRAM cache entry will be refreshed, the hand 210 of clock 209 is set to start 212.

To reduce overhead, the restore tracking circuit shares status bits with the directory (connections not shown). One common set of these status bits is called "MESI", an acronym for modified, exclusive, shared, and invalid. The invalid status bit indicates whether or not the cache entry is valid. The modified status bit indicates whether the contents of a cache line has been written by the processor. The other two status bits, exclusive and shared, relate primarily to a multiple processor environment and have less to do with the refresh process. Therefore, they will not be discussed any further.

Referring again to the example in FIG. 3a, the invalid 213 and modify 208 latch bits are preferably integrated within the restore tracking circuit. In the event that the data retention time, tracked by the clock 209 elapses 211, a signal 206 sets the invalid status bit 213 high. A high invalid status bit 213 designates that the data is invalid. In the usual case, the next time a request to that cache location is made, a miss will occur. That miss will cause the data packet to be fetched from main memory 30. However, if the modified status bit 208 is also high, indicating the cache line has been written, the AND gate 207 initiates a refresh search 214. Recall that in the example depicted in FIG. 2a, all the refresh search requests 130 were "OR" ed together to become a signal which is provided to the the search control logic 112 to initiate a refresh interrupt 135. During the interrupt, the address space of the directory 101 is searched (cycled) until the line requiring a refresh is located. The search stops when the directory address, that initiated the refresh search, is found. The directory entry will have a high modified bit 208 and a high invalid bit 213. A refresh of the data packet of the DRAM cache, corresponding to the directory entry, is then initiated 214, and the invalid status bit 213 is set to zero. These actions advantageously prevent a data packet within the memory hierarchy 60 from ever becoming corrupt.

To simplify FIG. 3a, Directory 101 connections to the invalid 213 and modify 208 latch bits have been omitted. While these status bits perform their routine function, it should be noted one additional constraint is imposed on them by the status logic 203. When the cache control logic elects to invalidate a data packet, setting its invalid bit to "1", the control logic 112 must also set the modify bit to "0". Otherwise, the AND gate 207 will trigger an inappropriate refresh search 214, when all that was desired was to invalidate the data packet (entry) within the cache.

While the preceding description has established a means to coordinate the refresh of data stored within a DRAM cache, those skilled in the art will appreciate that alternative approaches may be developed within the spirit and scope of the present invention. For example, a second will now be described for refreshing a cache entry (data packet) once its data retention time has elapsed, regardless of whether the DRAM cache entry has or has not been modified. FIG. 3b depicts an example of a revised restore tracking circuit, wherein a restore depends only on the status of the timer; directory status bits like invalid 213 and modify 208 do not complicate this example of the restore tracking circuit. Here, if the timer 309 reaches a maximum data retention time 311, a positive decoded refresh address signal 314 is asserted.

Figure 3B:
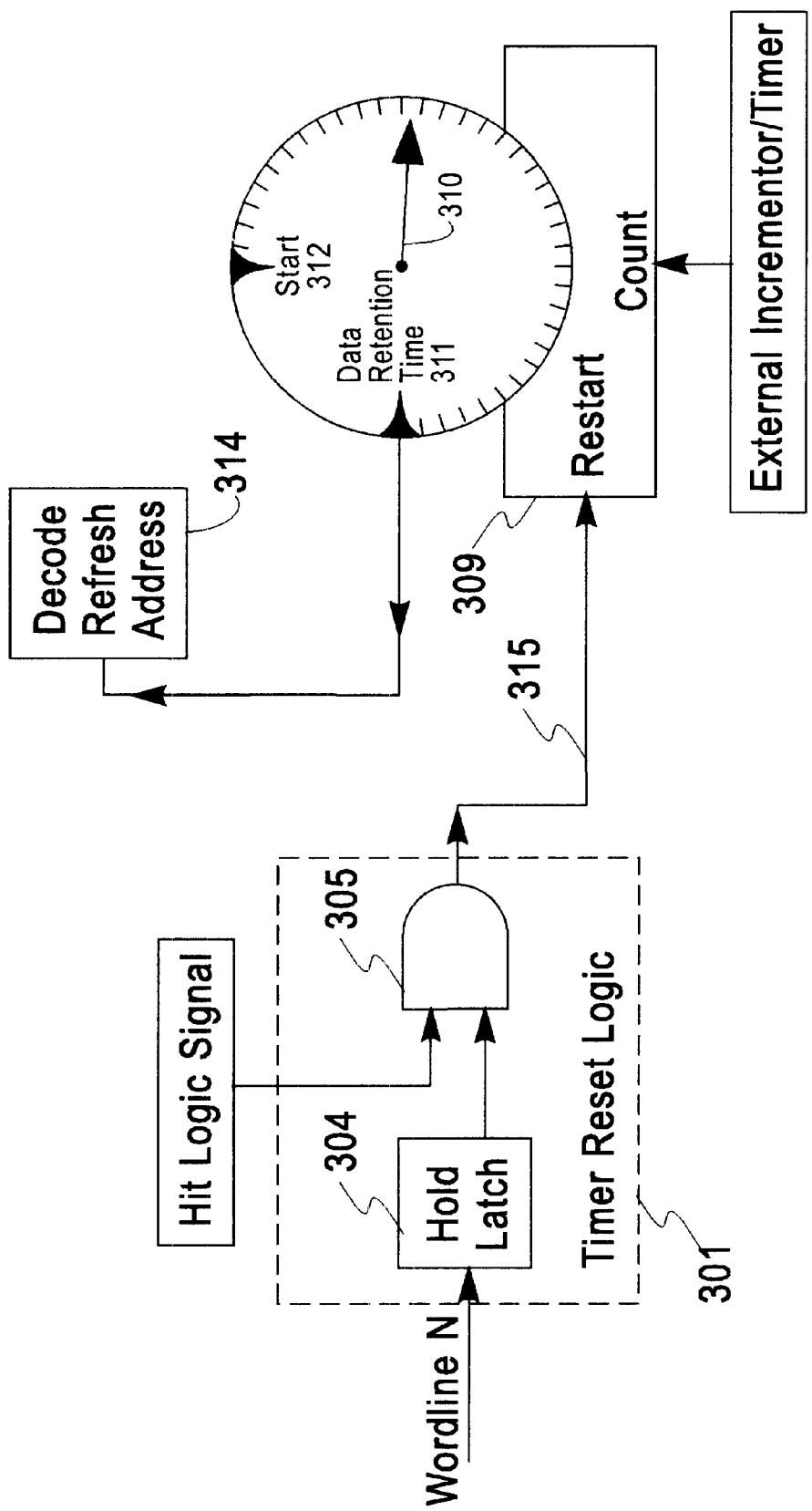
FIG. 3b depicts another example of the restore tracking circuit.
Figure 4:
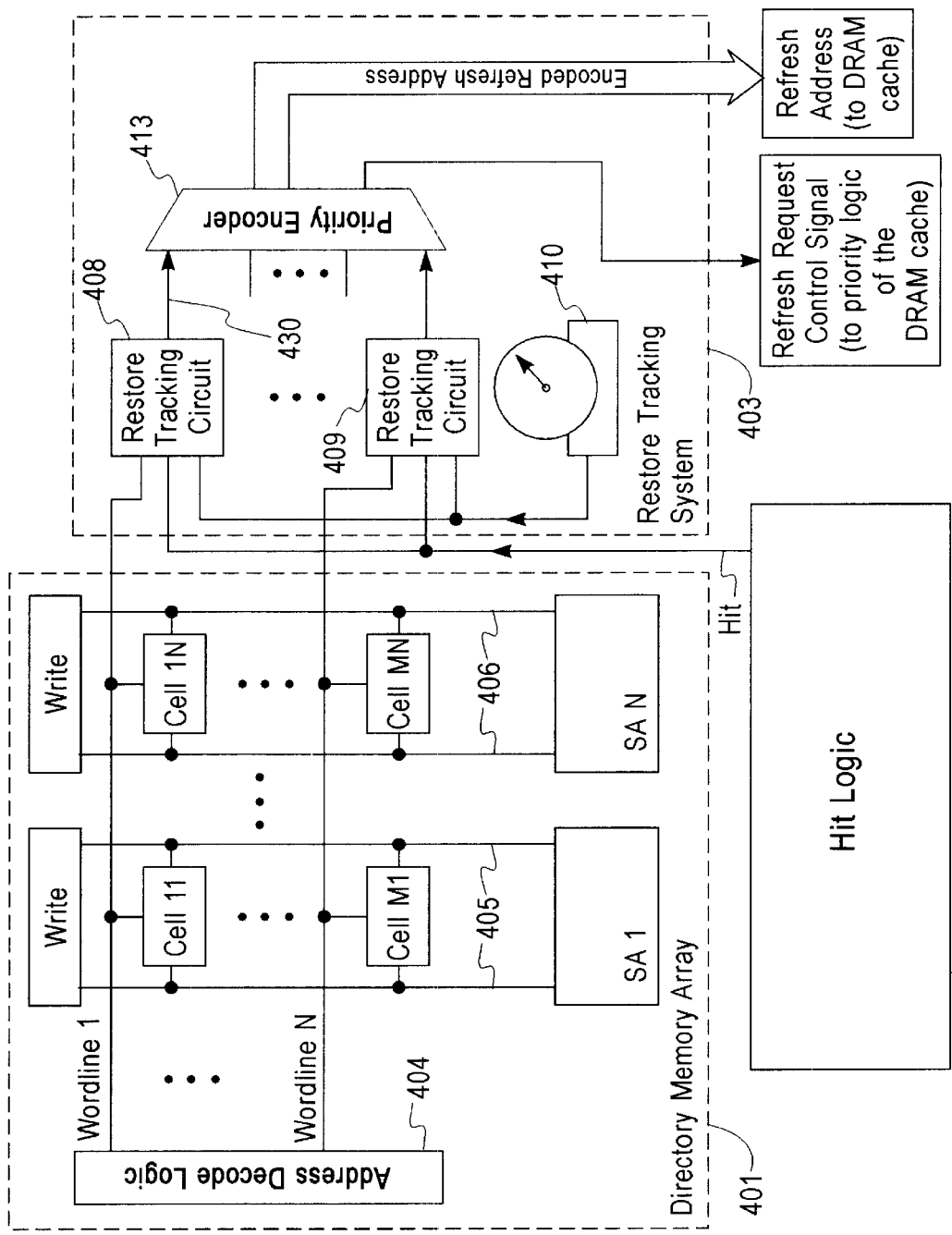
FIG. 4 depicts another example of a restore tracking system in accordance with the present invention.

Alterations made to the restore tracking circuit of FIG. 3b mandate modifications to higher level logic. FIG. 4 depicts an example of a corresponding modified restore tracking logic 403 integrated with the Directory memory array 401 and hit logic 402. The primary difference between the first and second embodiments, FIGS. 4 and 2 respectively, is that an encode logic 413 replaces the search control logic 112 of FIG. 2.

Unlike the first embodiment, the encode logic 413 is required to report the address of an expired timer directly to the DRAM used as a cache memory (FIG. 2b, 170) so the cache entry 160 the timer tracks can be refreshed. Since more than one timer may expire within a given cycle, encoding must be prioritized by the priority encode circuit of FIG. 5. The choice of which decoded state is assigned priority has little impact on the operation of the refresh circuitry.

Figure 5:
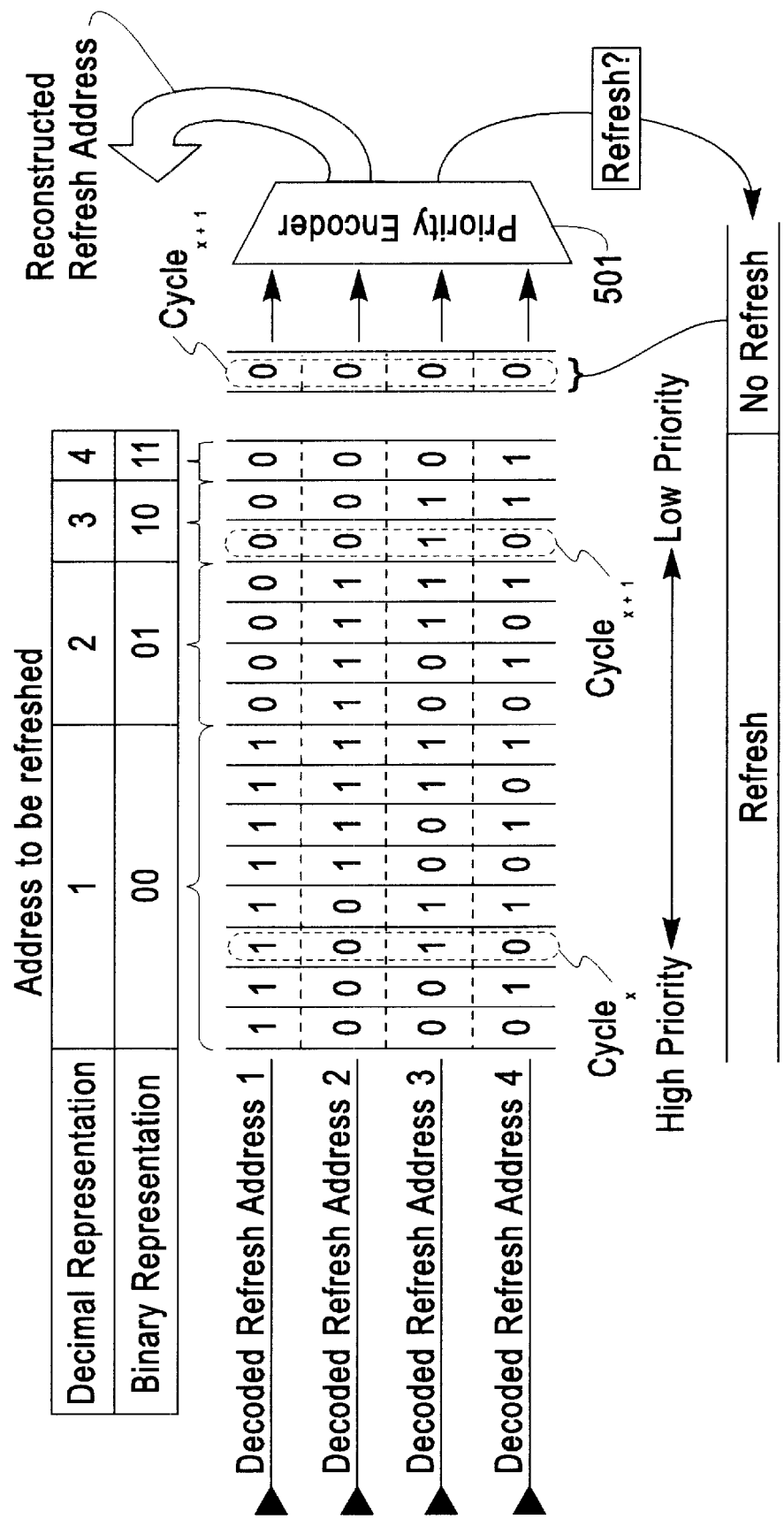
FIG. 5 depicts an example of a four bit priority encoder in accordance with the present invention.

FIG. 5 depicts an example of a 4-bit priority encoder. To illustrate the operation of FIG. 5, a highest priority has been assigned to refresh wordline 1 of FIG. 4, which corresponds to address "00" of FIG. 5. Whenever the timer within restore tracking circuit (FIG. 4, 408), dedicated to wordline 1, expires, a "1" appears on the decoded refresh address (FIG. 3b, 314) output of the restore tracking circuit. This signal is driven into the priority encode logic (FIG. 4, 413) through wire 430. A "1" in "decoded refresh address 1" row causes the priority encode logic to refresh the cache entry "00" first regardless of whether any other timer has expired. Once the cache entry "00" has been refreshed and its timer reset, the next highest priority refresh timer is processed. This process steps from highest priority to lowest until all the timers have been reset. Suppose for example that the decoded refresh address 1 and decoded refresh addresses 3 (FIG. 5) were high ("1") indicating the data retention time of cache entry 1 and cache entry 3 had elapsed. The priority encode logic of FIG. 5 would coordinate the refresh of the cache entry in the following manner: In "cycle x" of FIG. 5, the 4 bits enclosed by dashed lines would be delivered to the priority encode logic which would encode these as though only cache entry of address 1 ("00") needed to be refreshed. The control signal, "Refresh?", would be set high ("1") indicating the clock of the restore tracking circuit needs to be reset and the cache entry refreshed. During this special period allotted for refresh, regular access to cache and directory resources is denied. To reset the clock, the hit logic signal is set high at the same time as a read operation is conducted on wordline 1 (FIG. 4) of directory memory array 401. Just like in the case of a normal read or write action to the cache, this particular combination of signals forces the internal node (FIG. 3b, 315) of the restore tracking circuit high which in turn resets the clock hand 310 to start 312. Decoded refresh address 1 (FIG. 5) transitions to a zero. While the directory is undergoing these internal resets, cache entry 1 is read from, and then with the same data, written back to so as to refresh it. The full restoration of cache entry 1 is now complete. The restoration of Cache entry 3 proceeds following the aforementioned procedures, only for address 3 circuits, during the next restore cycle, "cycle x+1" (FIG. 5). Cache entry 3 is then refreshed, and decoded refresh address 3 is set to zero. When all four decoded refresh addresses of FIG. 5 are zero, corresponding to "cycle x+2", the cache resumes normal operation—all cache entries have been restored.

As evidenced by the two preceding embodiments, the selective refresh of DRAM cache entries of the present invention guarantees robust data storage without incurring the access penalty of a periodic interrupt, which would otherwise be used to refresh the cache. Only the subset of entries that have not already been refreshed by a read or write action need be restored. For each cache entry, a single timer, usually associated with the directory, counts down the time remaining before a refresh operation is necessary to maintain the data integrity of a given cache entry. Even if a timer expires, indicating an entry should be restored, that entry may still be allowed to become corrupt, in certain cases, because duplicate copies of the data can be retrieved from the memory hierarchy. Only a data packet, unique to the entire memory hierarchy, must be restored. Those skilled in the art will appreciate that the timer could alternatively be coupled to the wordline of the DRAM cache.

While the previous embodiments have shown the restore system integrated with the directory, these embodiments do not exclude a standalone implementation of the restore system or an implementation integrated with the Cache. All selective refresh systems include the following fundamental components: dedicated restore tracking circuits to record and update the refresh status of each cache entry; and restore control logic to refresh cache entries having an expired timer. What follows next is a description of further enhancements that can be made to the restore tracking system and its subcomponents.

In the two major embodiments of the restore tracking system, the address of the elapsed timer was either directly reported to the restore priority encode logic or located by a search coordinated by the restore search control logic 112. The priority encode embodiment (FIGS. 4 and 5) encodes the address of the expired timer so the DRAM cache entry can be refreshed immediately. The search embodiment (FIGS. 2 and 3a–b) simplifies the error reporting logic connected directly to the restore tracking circuits, forging it into a large OR gate 125, at the expense of additional control logic 112 to support a search of the directory and the interruption of directory access while the search is proceeding. A compromise between these two embodiments divides the address space into two regions delineated by two "Process a refresh interrupt" 135 signals which are used to narrow the search of the directory by 5%. Addresses from 0 to (N/2) −1 would be covered by one signal, addresses from N/2 to N−1 by the other.

Figure 6A:
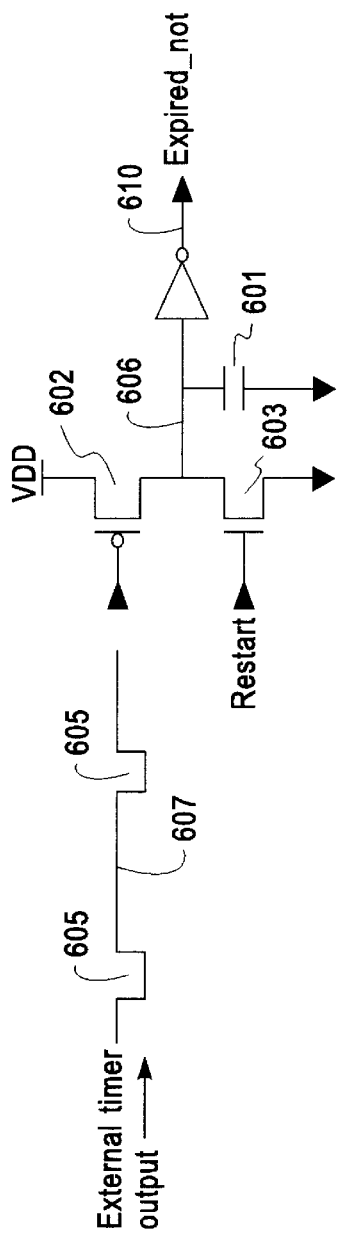
FIG. 6a depicts an example of an analog implementation of a clock which tracks data retention time.
Figure 7:
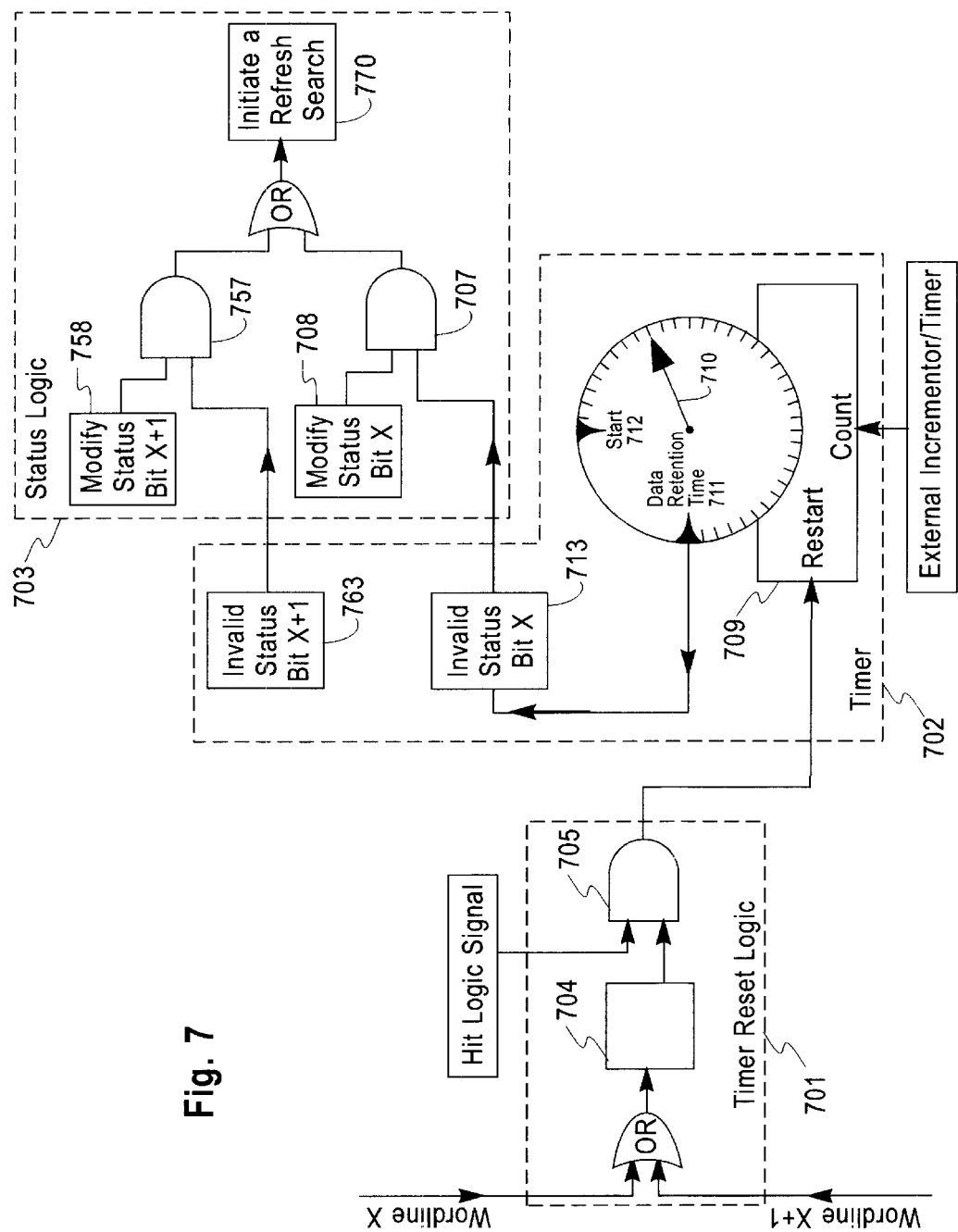
FIG. 7 shows a third example of a restore tracking circuit in accordance with the present invention.

Many options exist for implementing the timer (209, 309, or 709) of the restore tracking circuit (FIGS. 3a, 3b, or 7). It could be a saturating N bit digital counter, already known in the art, having a "clear" or "restart" input to reset the counter. However to minimize area overhead, it may be wiser to construct the timer using an analog core. For example, FIG. 6A depicts one solution in which the time, represented by charge, is collected on a capacitor 601. Every time the restore tracking system's external timer (110 and 410) fires, it produces a pulse 605 which activates PFET 602 for a fixed duration. An active PFET 602 deposits charge onto the capacitor 601 which causes the capacitor's voltage to increase by a proportional amount. The total charge deposited by each pulse is computed by multiplying the PFET 602 current by the pulse width 605. After receiving a number of these pulses, the capacitor 601 accumulates enough charge so that its voltage crosses the threshold of the inverter 604.

Figure 6B:
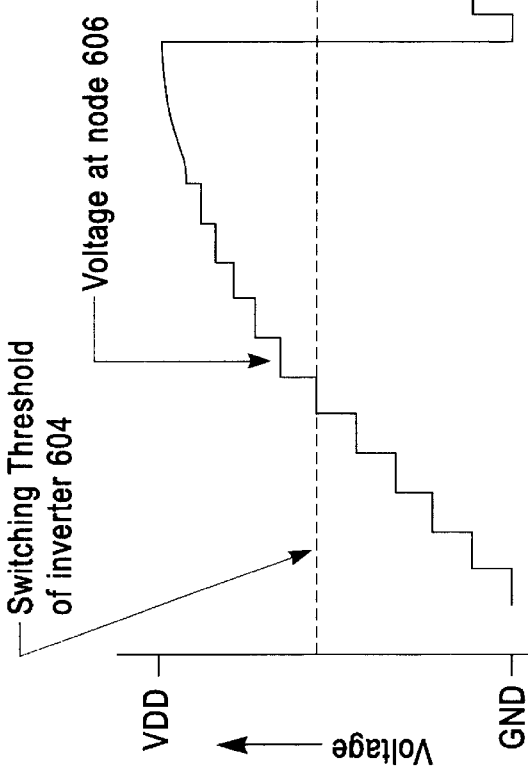

FIG. 6b depicts an example of the node voltage 606 moving in steps over time. Each step corresponds to a pulse received from the external timer (110 and 410). Once the threshold of inverter 604 is crossed on node 606, inverter 604 drives the "expired$_{13}$not" signal 610 low, indicating the data retention time has expired (A high or low signal convention is unimportant since an inverter can be used to change the phase of the signal). The Pulse width 605, length and width of PFET 602, and capacitance of capacitor 601 should be sized to achieve a desired timing objective (data retention time) defined in terms of a fixed number of pulses issued by the external timer (110 and 410). Whenever a memory block has been restored, the NFET 603 is used to restart the timer by discharging the capacitor 601 to ground as shown in FIG. 6B.

Figure 6C:
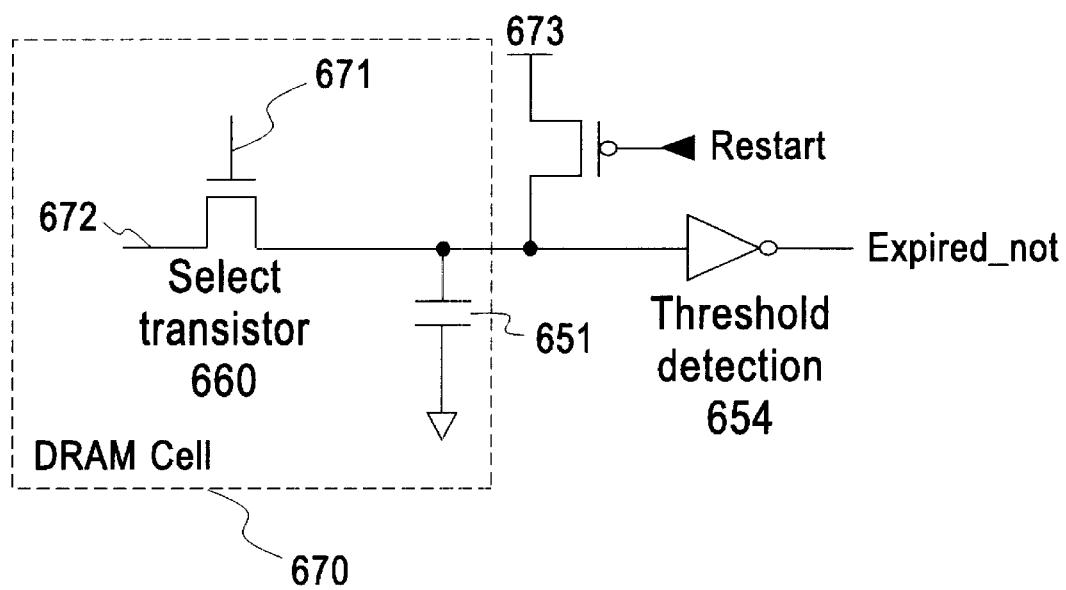
FIG. 6c depicts an example of the analog timing component including a DRAM cell.

Another analog timer worth considering is one constructed out of a DRAM cell where intrinsic leakage currents discharge (or charge) the cell capacitance, and like the last example, a threshold monitoring inverter determines whether the data retention time has elapsed. As depicted in FIG. 6c, an example of the analog timing component includes a DRAM cell 670. The DRAM cell 670 is coupled to an inverter 654 which is used as the thresholding detecting device for determining the refresh status. In addition to the DRAM cell, this timer would comprise a NFET or PFET to preset the capacitor of the DRAM cell (thus restart the timer) much like NFET 603 and a threshold detection device much like inverter 604. A reset (or restart) device 673 sets the DRAM cell to a known voltage. The leakage built into the DRAM cell timer would supplant the need for a device like PFET 602.

While the aforementioned analog timers appear simple in concept, they may exhibit problems in practice because leakage currents that affect analog cells are notoriously unpredictable. It is thus contemplated that a digital solution, while occupying more area, may be the only robust solution available.

To simplify the earlier embodiments, a one to one correspondence had been assumed between the directory wordline and the cache entry. However in actual products, different Directory and Cache geometry's exist, and so for example, two DRAM cache entries, or two data blocks, may be accessed when either Directory wordlineX or wordlineX+1 is asserted. In this case, a shared restore tracking circuit can serve both wordlines as depicted in FIG. 7. As depicted, an OR gate 720 combines wordlines X and X+1 into a signal which feeds the restore tracking circuit. In addition, an extra Invalid Status Bit 763 and Modify Status Bit 758 have been included to represent the extra wordline X+1. Should the natural restore operation of the cache, for a read or write operation, cover less than a single directory wordline, the opposite situation arises. More than one restore tracking circuit is required for each wordline. AND logic may be used to do the additional decoding required to single out which tracking circuit, among those connected to the wordline, should be reset. Because the description references a variety of restore tracking circuits like the shared restore tracking circuit, persons skilled in the art should recognize the inventive principles stated herein apply to even more complex embodiments of the restore tracking circuit wherein, for example, timer reset logic has a plurality of inputs which trigger the restart of the timer, and status logic has a plurality of outputs which initiate a refresh search or feed a priority address encoder. In the case of the restore tracking system (103, 403) the restore tracking circuits (108–109, 408–409) may be interchanged among the principal embodiments of the restore tracking system.

Figure 8:
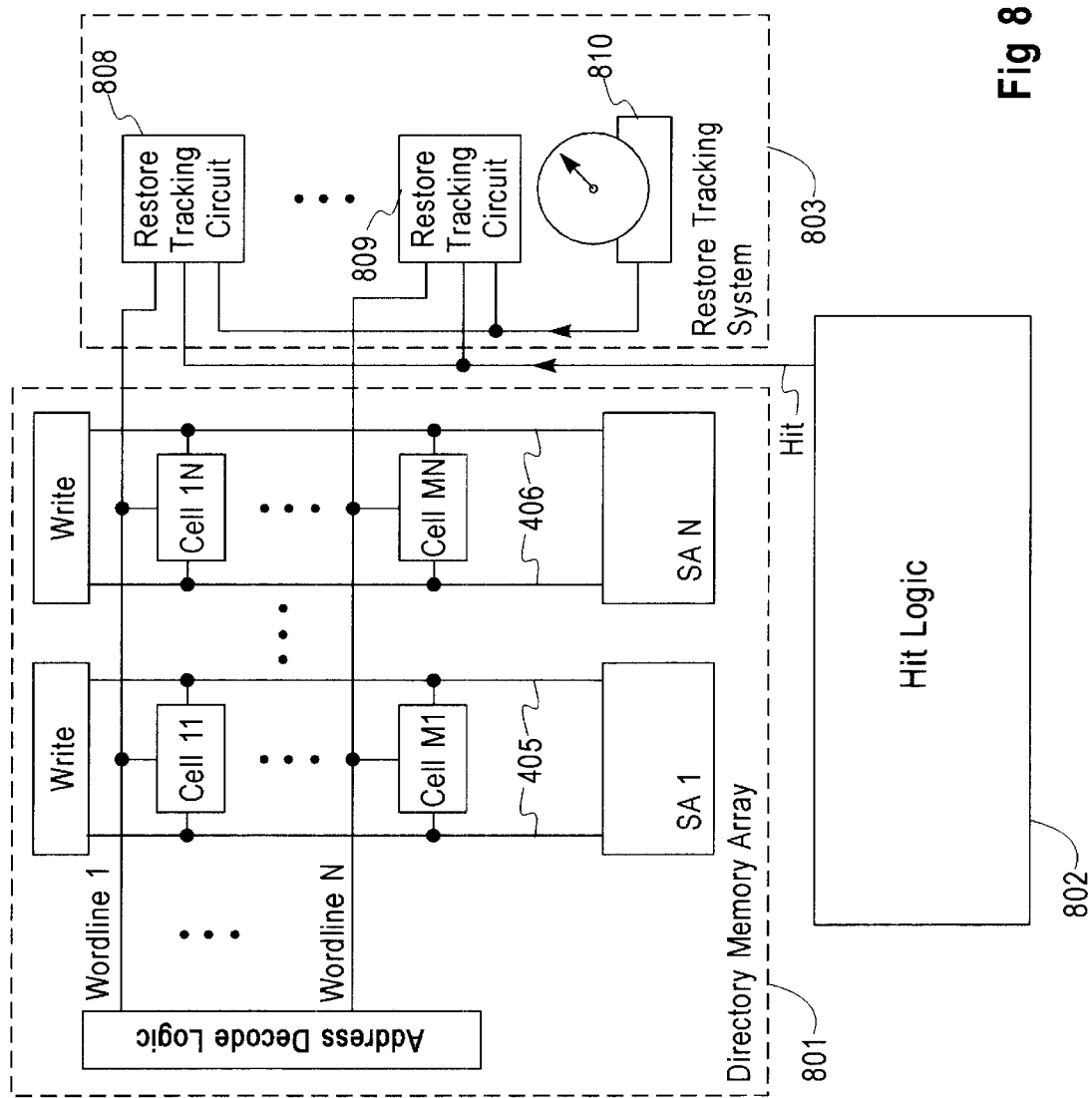
FIG. 8 depicts another example of a restore tracking system in accordance with the present invention for a store-through type cache.
Figure 9:
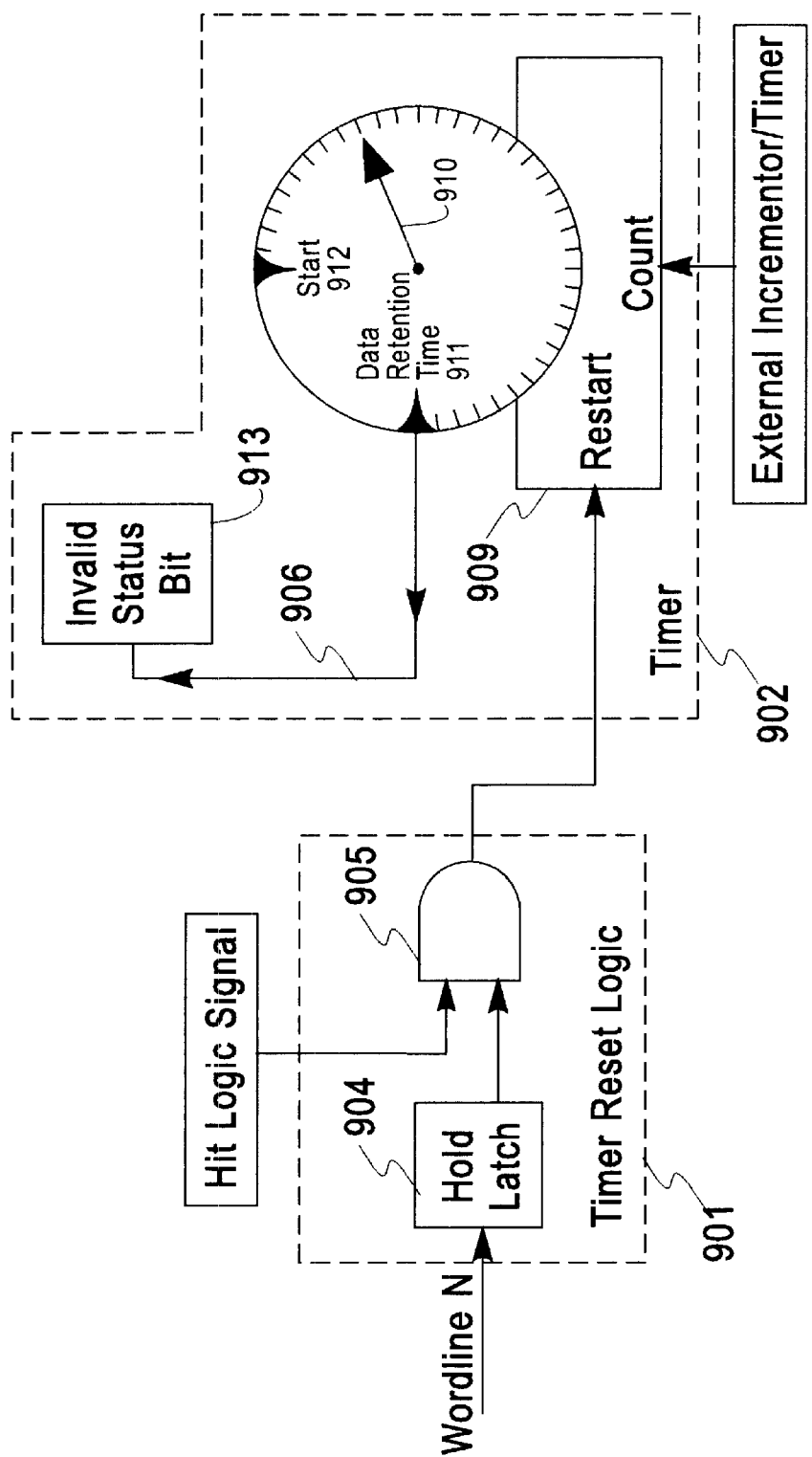
FIG. 9 depicts an example of the restore tracking circuit depicted in FIG. 8.

FIGS. 8 and 9 together depict yet another example of a restore tracking system 803, in particular for a store-through type cache. By way of overview, in a store-through cache, a second copy of a data packet exists at a next level of the memory hierarchy, the main memory (FIG. 1, 30) and thus duplicate copies of those data packets which have expired within the cache 20 can always be fetched from the next level of memory hierarchy. The store-through cache represents a special case of the most general cache architecture.

Referring now to FIGS. 8 and 9, recall that the operation of the Directory Memory array 801, Hit Logic 802, and Timer Reset Logic 901 were described previously and thus will not be repeated here. Note that the search control logic (FIG. 2a) and the associated Initiate a Refresh Search (FIG. 3a, 214); or priority encode logic (FIGS. 4–5) and the associated Decoded refresh Address (FIG. 3b, 314) signals, are not required (and thus not depicted) in FIGS. 8–9.

As depicted, the restore tracking circuits (808 through 809) (only two of which are shown, for simplicity) monitor the time elapsed 910 since a cache entry (data packet) was last refreshed 912. An external clock 810 synchronizes the internal clocks 909 of each restore tracking circuit. One restore tracking circuit is devoted to each cache entry (data packet) (FIG. 2b, 160). As a means of sharing decoding circuitry between the directory memory array 801 and the restore tracking System 803, wordlines 1 . . . N connect to the restore tracking circuits 808 through 809. A one to one correspondence between the directory wordline and a DRAM cache entry (data packet) is again assumed for simplicity sake until otherwise noted.

Referring now to FIG. 9, the Data Retention Time 911 ("expired" status) of the cache entry (data block) is simply communicated by way of the invalid status bit 913, which is directly connected (connection not shown) to the Directory (FIG. 8, 801). Here, the block of data stored in a store-through cache can be invalidated once its dedicated timer 909 has expired 911 without having to test the value of a corresponding modify status bit (i.e., has the cell been written to) because an exact copy of the data, by definition, exists at the next level of memory hierarchy. Given that the clock 909 within the restore tracking circuit (808, 809) has expired 911 and has asserted 906 the invalid bit 913 high, the data within the cache is allowed to become corrupt. The next time it is requested, a miss will occur in the DRAM cache (FIG. 1, 20) so the corrupt copy is not used. A clean copy of the data block will then be fetched from main memory (FIG. 1, 30) following any traditional cache miss protocol.

Those skilled in the art will appreciate that the restore tracking system of the present invention can be applied to other memory architectures, e.g., those that do not require a Directory (101, 410, 801). For example, a valid bit can be directly associated with each data block in a DRAM memory, and thus a Directory or address tagging scheme is not required. Those skilled in the art will also appreciate that the restore tracking system of the present invention can be applied to any memory type having duplication of information.

Having described preferred embodiments of a novel restore tracking system, with alternatives, modifications and variations will become apparent to those skilled in the art. It is therefore to be understood that changes may be made in the particular embodiments of the invention disclosed that are within the scope and spirit of the invention as outlined by the appended claims.

Having thus described our invention, what we claim as new, and desire to secure by Letters Patent is:

1. A restore tracking system for reducing a number of refresh actions needed to maintain data entries in a DRAM, comprising:

restore tracking means for recording and updating a refresh status of one or more of said data entries in said DRAM; and control logic means, coupled to said restore tracking means, for refreshing said one or more of said data entries having an expired status.

2. The restore tracking system of claim 1, further comprising:

said restore tracking means comprising:

a timer for tracking a time elapsed since a data entry has been refreshed; and means for asserting a positive decoded refresh address signal once the timer has expired;

said control logic means comprising priority encode logic means for mapping said positive decoded refresh address signal to an encoded refresh address.

3. The restore tracking system of claim 2, further comprising:

multiple said restore tracking means, all of which assert a positive decoded refresh address signal once the timer has expired; and said control logic means comprising priority encode logic for generating both an encoded refresh address, which is sent to the DRAM, and a refresh request control signal to direct a refresh of said encoded refresh address.

4. The restore tracking system of claim 3, said priority encode logic, further comprising:

means for handling multiple requests over an extended number of memory cycles using a predetermined ordering, wherein more than one said decoded refresh address signal may be positive at any given time.

5. The restore tracking system of claim 1, further comprising:

a cache memory wherein said DRAM is integrated within said cache memory.

6. The restore tracking system of claim 1, wherein said DRAM includes blocks of memory cells which are refreshed by an external means, said restore tracking system further comprising:

a plurality of restore tracking circuits, each devoted to a block of memory cells for tracking the total time elapsed since said block was last restored, and specifying a maximum data retention time of said DRAM; and said external means comprising means for triggering a refresh of said block if said restore tracking circuit for said block reaches said maximum data retention time.

7. The restore tracking circuit of claim 1, wherein said DRAM is coupled to said restore tracking means, said DRAM including blocks of memory cells which are refreshed by naturally occurring read and write actions, said restore tracking circuit further comprising:

a timer for monitoring a total time elapsed since a block of memory was last refreshed; and timer reset logic, coupled to the timer, for restarting said timer upon determining said block of cells has been restored by said naturally occurring read or write actions to said DRAM.

8. The restore tracking system of claim 1, further comprising:

said restore tracking means comprising a timer for tracking a time elapsed since a data entry has been refreshed;

OR logic, coupled to said restore tracking circuit, for generating an address search request if the timer expires; and said control logic comprising search control logic means for locating an address of the expired timer, said control logic coupled to said OR logic,.

9. The restore tracking system of claim 1, further comprising:

a cache memory wherein said DRAM is integrated within said cache memory and one restore tracking means is coupled to each DRAM cache entry;

hit logic means coupled to said restore tracking means;

a directory of the DRAM cache, coupled to the hit logic and said restore tracking system, the directory holding tag address bits and directory status bits, said status bits defining whether a cache entry status is valid and whether it can be read or written; and in response to a request for a particular address is directed to the cache, the tag address is read out of the directory and driven into the hit logic;

said hit logic means, further coupled to the directory, for comparing the tag address with a tag portion of the requested address; wherein if the two tags match, a cache hit is said to have occurred in the cache and if the two tags do not match, a cache miss is said to have occurred in the cache;

said restore tracking means comprising: means for determining that a data retention time for the cache entry in said expired status and designating that data associated with the entry has an invalid status; means for determining and designating that the data has a modified status; and means for generating a refresh search request for data whose status is both invalid and modified;

said control logic means comprising search control logic means for detecting said search request and process a refresh search and a refresh interrupt, during which regular access to said directory is interrupted for the refresh search and the address space of the directory is searched until a directory entry associated with the data whose said status is both invalid and modified is located; said control logic further comprising means for refreshing the data in the DRAM cache corresponding to a located directory entry and resetting the invalid status.

10. The restore tracking system of claim 1, wherein a periodic refresh of DRAM entries is eliminated.

11. The restore tracking system of claim 1, wherein said restore tracking system is coupled to a directory memory array and a cache.

12. The restore tracking system of claim 1, further comprising means for tracking when a memory location was last restored.

13. The restore tracking system of claim 1, wherein said restore tracking means comprises one of an analog and a discrete timing component for tracking said refresh status.

14. The restore tracking system of claim 13 wherein said timing component is a saturating N bit digital counter, having an input to controllably reset the counter.

15. The restore tracking system of claim 13, further comprising:

said timing component comprising an analog timing component wherein time is represented by charge collected on a capacitor.

16. The restore tracking system of claim 15, further comprising:

an external timer, coupled to said analog timing component, for periodically depositing charge onto the capacitor and causing a voltage across the capacitor to increase by a proportional amount until the capacitor accumulates enough charge so that the voltage crosses a predetermined threshold.

17. The restore tracking system of claim 13, wherein said analog timing component comprises a DRAM cell; said DRAM cell coupled to a thresholding detecting device for determining the refresh status; and a reset device which sets the DRAM cell to a known voltage.

18. The restore tracking system of claim 1, said restore tracking means further comprising:

a timer for monitoring a total time elapsed since said entry was last refreshed; and timer reset logic for restarting said timer upon determining said entry has been restored by a naturally occurring read or write action to said DRAM.

19. The restore tracking system of claim 18, wherein said timer is an internal timing element, further comprising:

a restart input which when enabled will reset the timer to a start position;

a data retention output which when active indicates said entry has reached a maximum data retention time.

20. The restore tracking system of claim 18 wherein said internal timing element is connected to a system clock through at least one stage of timing logic, comprising:
 a master digital clock derived off said system clock which produces a pulse only after an integral number of system clock cycles have occurred; and
 a plurality of said digital timers, fed by said master digital clock, which counts in increments of master digital clock pulses.

21. The restore tracking system of claim 19, wherein said internal timing element is connected to an external clock which is dedicated to restore and wherein said internal timing element is one of an analog or digital timer.

22. The restore tracking system of claim 18, further comprising:
 a directory memory array; and a cache; wherein said restore tracking system is coupled to the directory memory array and the cache;
 said restore tracking means comprising means for monitoring a data retention time of blocks of memory indirectly by way of the directory memory array.

23. The restore tracking system of claim 1, further comprising:
 a directory memory array coupled to said restore tracking means;
 hit logic means, coupled to said directory memory array and to said restore tracking means, for generating a hit logic signal which indicates a directory hit or miss; wherein the hit logic signal is used to determine whether said block of cells within the DRAM will be restored by one of a read or write operation.

24. The restore tracking system of claim 22 further comprising:
 a directory memory array coupled to said restore tracking means;
 status logic for forming a status signal for said restore tracking means by combining said data retention time with an output of status bits commonly used by the directory.

25. The restore tracking system of claim 24, wherein the status bits are selected from the group consisting of one or more of: an invalid bit; a valid bit; a modified bit; and an unmodified bit.

26. The restore tracking system of claim 22 wherein said restore tracking means are driven directly by decoded or partially decoded address bits of said directory.

27. The restore tracking system of claim 22, wherein decoded or partially decoded address bits of said directory feed logic, which performs "AND" or "OR" operations for one or more of restricting and broadening the address space covered by each restore tracking means, and following an address space transformation, the resultant signals feed said restore tracking means.

28. The restore tracking system of claim 1, further comprising means for refreshing only those entries that have been modified.

29. The restore tracking system of claim 1, wherein said restore tracking system is coupled to a directory memory array and a cache and wherein said DRAM is integrated in said cache, further comprising means for invalidating in the directory, data packets whose data will expire, but exist in duplicate within the memory hierarchy.

30. The restore tracking system of claim 1, wherein said control logic means further comprises:
 search logic means for searching the cache directory to isolate an address having modified data and an expired data retention timer, so that the cache entry corresponding to said address may be refreshed.

31. In a system including DRAM integrated within a cache memory, a restore tracking system, for reducing a number of refresh actions needed to maintain data in said DRAM, the restore tracking system comprising:
 said DRAM including blocks of memory cells which can be refreshed by an external mechanism;
 a restore tracking circuit devoted to each said block of memory cells for the purpose of tracking a total time elapsed since said block was last restored;
wherein said external mechanism comprises external means for triggering a refresh of said block if said restore tracking circuit of the said block reaches a maximum specified data retention time of said DRAM.

32. The restore tracking system of claim 31, wherein said external means for triggering a refresh, further comprises:
 multiple said restore tracking circuits, each of which includes a dedicated timer;
 each multiple restore tracking circuit comprising means for asserting a positive decoded refresh address signal once the dedicated timer has expired;
 priority encode logic, coupled to said restore tracking circuits, for mapping one positive said decoded refresh address signal at a time to an encoded refresh address, and handling multiple requests over an extended period of memory cycles using a predetermined ordering, inconsequential to the restore process, wherein more than one said decoded refresh address signal may be positive at any given time; and
 said priority encode logic comprising means for producing both: said encoded refresh address, which is sent to the DRAM cache; and a refresh request control signal, which directs said DRAM to process refresh of said encoded refresh address.

33. The restore tracking system of claim 31, further comprising:
 said restore tracking circuit comprising a timer for tracking a time elapsed since a data entry has been refreshed;
 OR logic, coupled to said restore tracking circuit, for generating a search request if the timer expires; and
 said control logic comprising search control logic, coupled to said OR logic, for locating an address of the expired timer.

34. The restore tracking system of claim 31, further comprising:
 a cache directory coupled to the restore tracking circuit;
 search logic for searching the cache directory to isolate an address having modified data and an expired data retention timer, so that a cache entry corresponding to said address can be refreshed.

35. The restore tracking system of claim 31, wherein a periodic refresh of DRAM entries is eliminated.

36. The restore tracking system of claim 31, wherein said restore tracking system is coupled to a directory memory array and the cache.

37. The restore tracking system of claim 31, further comprising means for tracking when a memory location was last restored.

38. The restore tracking system of claim 31, wherein said restore tracking circuit comprises one of an analog and a discrete timing component for tracking one or more of said refresh status and said expired status.

39. The restore tracking system of claim 38 wherein said timing component is a saturating N bit digital counter, having an input to controllably reset the counter.

40. The restore tracking system of claim 38, further comprising:
said timing component comprising an analog timing component wherein time is represented by charge collected on a capacitor.

41. The restore tracking circuit of claim 40, further comprising:
an external timer, coupled to said analog timing component, for periodically depositing charge onto the capacitor and causing a voltage across the capacitor to increase by a proportional amount until the capacitor accumulates enough charge so that the voltage crosses a predetermined threshold.

42. The restore tracking system of claim 13, wherein said analog timing component comprises a DRAM cell; said DRAM cell coupled to a thresholding detecting device for determining the refresh status; and a reset device which sets the DRAM cell to a known voltage.

43. The restore tracking circuit of claim 31, said restore tracking means further comprising:
a timer for monitoring a total time elapsed since said entry was last refreshed; and
timer reset logic for restarting said timer upon determining said entry has been restored by a naturally occurring read or write action to said DRAM.

44. The restore tracking circuit of claim 43, wherein said timer is an internal timing element, further comprising:
a restart input which when enabled will reset said timer to a start position;
a data retention output which when active indicates said entry has reached a maximum data retention time.

45. The restore tracking circuit of claim 43 wherein said internal timing element is connected to a system clock through at least one stage of timing logic, comprising:
a master digital clock derived off said system clock which produces a pulse only after an integral number of system clock cycles have occurred; and
a plurality of said digital timers, fed by said master digital clock, which counts in increments of master digital clock pulses.

46. The restore tracking circuit of claim 44, wherein said internal timing element is connected to an external clock which is dedicated to restore and wherein said internal timing element is one of an analog or digital timer.

47. A method for refreshing a DRAM, comprising the step of selectively refreshing only a subset of a DRAM data that has not already been refreshed by a read or write action; wherein a refresh is performed without requiring a periodic interrupt to refresh the DRAM.

48. The method of claim 47, wherein said DRAM comprises a DRAM cache, further comprising the steps of:
searching a cache directory to isolate an address having modified data and an expired data retention timer;
refreshing a cache entry corresponding to said address, in response to said searching step.

49. A method for searching a cache directory, so that a cache entry in a DRAM cache corresponding to a directory address in said cache directory may be refreshed, comprising the steps of:
(a) identifying a directory address associated with data having a status of modified and invalid; wherein an invalid status is associated with an expired data retention timer;
(b) initiating a refresh search of the cache directory and interrupting regular access to the cache directory, in response to said identifying step;
(c) searching cache addresses in the cache directory and reading said invalid and modified status of an associated directory entry;
(d) if both a modified status bit and an invalid status bit of the directory entry are true, then identifying a cache address and proceeding to step (e), else returning to said step (b);
(e) sending the refresh address to the cache so the cache entry may be restored; and
(f) resetting the invalid bit to zero.

50. A method for reducing a number of refresh actions needed to maintain data entries in a DRAM, comprising the steps of:
recording and updating a refresh status of one or more of said data entries in said DRAM; and
refreshing said one or more of said data entries having an expired status.

51. The method of claim 50, further comprising the steps of:
tracking a time elapsed since a data entry has been refreshed;
determining that a data retention time for the data entry has expired; and
asserting a positive decoded refresh address signal for an expired data entry; and
mapping said positive decoded refresh address signal to an encoded refresh address.

52. The method of claim 50, wherein said DRAM is integrated within said cache memory.

53. The method of claim 50, wherein said DRAM includes blocks of memory cells which are refreshed by an external means, said method further comprising the steps of:
a plurality of restore tracking circuits, each devoted to a block of memory cells for tracking a time elapsed since said block was last restored, and specifying a maximum data retention time of said DRAM; and
triggering a refresh of said block if said block reaches said maximum data retention time.

54. The method of claim 50, wherein said DRAM is coupled to said restore tracking circuit, said DRAM including blocks of memory cells which are refreshed by naturally occurring read and write actions, said method further comprising the steps of:
monitoring a total time elapsed since a block of memory was last refreshed;
determining said block has been restored by said naturally occurring read or write actions to said DRAM; and
restarting said monitoring, in response to said step of determining said block of cells has been restored by said naturally occurring read or write actions to said DRAM.

55. The method of claim 50, further comprising the steps of:
tracking a time elapsed since a data entry has been refreshed;
determining that a data retention time for the data entry has expired; and
generating a search request if the retention time for the data entry has expired; and
locating an address of an expired data entry.

56. The method of claim 50, wherein a periodic refresh of DRAM entries is eliminated.

57. The method of claim 50, wherein said restore tracking system is coupled to a directory memory array and a cache.

58. The method of claim 50, further comprising the step of tracking when a memory location was last restored.

59. The method of claim 50, further comprising the step of providing one of an analog and a discrete timing component for tracking one or more of said refresh status and said expired status.

60. The method of claim 59, wherein said timing component comprises an analog timing component, the method further comprising the step of:

collecting charge on the capacitor, wherein time is represented by an amount of charge collected on the capacitor.

61. The method of claim 51, further comprising the step of:

an external timer periodically depositing charge onto the capacitor causing a voltage across the capacitor to increase by a proportional amount until the capacitor accumulates enough charge so that the voltage crosses a predetermined threshold.

62. The method of claim 59, wherein said analog timing component comprises a DRAM cell; said DRAM cell coupled to a thresholding detecting device for determining the refresh status; and a reset device which sets the DRAM cell to a known voltage.

63. The method of claim 50, further comprising the steps of:

a timer monitoring a total time elapsed since said entry was last refreshed;

determining said entry has been restored by a naturally occurring read or write action to said DRAM; and restarting said timer, in response to said determining step.

64. The method of claim 63, wherein said timer is an internal timing element selected from a group consisting of: an analog timer; or a digital timer.

65. The method of claim 50, further comprising the step of refreshing only those entries that have been modified.

66. The method of claim 50, wherein said DRAM is integrated within a cache memory, further comprising the step of searching a cache directory to isolate an address having modified data and an expired data retention timer, so that a cache entry corresponding to said address may be refreshed.

67. In a memory hierarchy including DRAM integrated within a store-through cache memory, a restore tracking system for reducing a number of refresh actions needed to maintain data in said DRAM, the restore tracking system comprising:

said DRAM cache subdivided into blocks of memory cells storing data at a first level of the hierarchy;

a directory for said DRAM cache;

a second level of the hierarchy including a superset of data stored within said DRAM cache;

a restore tracking circuit devoted to each said block of memory cells, said restore tracking circuit comprising:

a timer for tracking a total time elapsed since a block of memory was last restored;

an invalid status bit coupled to the timer and to the directory for a directory status of said block of memory;

wherein if said timer for said block expires, said invalid bit is set so that a subsequent request for said block will produce a miss in the directory and cause said block to be fetched from said next level of memory hierarchy.

68. The restore tracking circuit of claim 67, wherein said DRAM is coupled to said restore tracking means, said DRAM including blocks of memory cells which are refreshed by naturally occurring read and write actions, said restore tracking circuit further comprising:

timer reset logic, coupled to the timer, for restarting said timer upon determining said block of cells has been restored by said naturally occurring read or write actions to said DRAM.

69. The restore tracking system of claim 67, wherein the timer is selected from a group consisting of an analog timing component or a discrete timing component.

70. The restore tracking system of claim 69 wherein the timer is a saturating N bit digital counter, having an input to controllably reset the counter.

71. The restore tracking system of claim 69, further comprising:

the analog timing component wherein time is represented by charge collected on a capacitor.

72. The restore tracking system of claim 71, further comprising:

an external timer, coupled to said analog timing component, for periodically depositing charge onto the capacitor and causing a voltage across the capacitor to increase by a proportional amount until the capacitor accumulates enough charge so that the voltage crosses a predetermined threshold.

73. The restore tracking system of claim 69, wherein said analog timing component comprises a DRAM cell; said DRAM cell coupled to a thresholding detecting device for determining the refresh status; and a reset device which sets the DRAM cell to a known voltage.

74. A method for reducing a number of refresh actions needed to maintain data entries in a DRAM, comprising:

recording and updating a refresh status of one or more of said data entries in said DRAM; and invalidating said one or more of said data entries having an expired status.

75. The method of claim 74, wherein said DRAM is coupled to said restore tracking means, said DRAM including blocks of memory cells which are refreshed by naturally occurring read and write actions, said method further comprising the step of:

restarting a timer upon determining said block of cells has been restored by said naturally occurring read or write actions to said DRAM.

76. The method of claim 74, wherein the timer is selected from a group consisting of an analog timing component or a discrete timing component.

77. The method of claim 76 wherein the timer is a saturating N bit digital counter, having an input to controllably reset the counter.

78. The method of claim 76, further comprising the step of:

the analog timing component wherein time is represented by charge collected on a capacitor.

79. The method of claim 72, further comprising the step of:

an external timer periodically depositing charge onto the capacitor and causing a voltage across the capacitor to increase by a proportional amount; and detecting that the capacitor has accumulated enough charge so that the voltage crosses a predetermined threshold.

80. The method of claim 76, wherein said analog timing component comprises a DRAM cell coupled to a threshold detecting device, further comprising the step of:

the threshold detecting device detecting the refresh status; and setting the DRAM cell to a known voltage, in response to said determining step.

* * * * *